United States Patent [19]

Olds

[11] 4,246,789
[45] Jan. 27, 1981

[54] GRADUATE WITH AUTOMATIC MEASURING MEANS

[76] Inventor: George M. Olds, 3401 Glasgow Dr., Lansing, Mich. 48910

[21] Appl. No.: 88,081

[22] Filed: Oct. 24, 1979

[51] Int. Cl.³ .............................................. G01F 19/00
[52] U.S. Cl. ...................................... 73/427; 422/100
[58] Field of Search ................. 73/426, 427, 428, 429, 73/302; 222/158; 422/99, 100

[56] References Cited

U.S. PATENT DOCUMENTS 3,888,126   6/1975   Cross ....................................... 73/427

*Primary Examiner*—Donald O. Woodiel
*Attorney, Agent, or Firm*—Malcolm R. McKinnon

[57] ABSTRACT

A graduate with automatic measuring device comprised of a tubular body portion closed at the lower end thereof by a base while the upper end portion of the tubular body is open and provided with a pouring lip, the tubular body portion having an opening therein directly below the pouring lip and through which a flexible tube passes with the inner end of the tube adjustably disposed at the level within the graduate to which it is desired to ultimately fill the graduate. A flanged, flexible, resilient, movable disc is provided which fits tightly around the tubular body portion of the graduate, the disc being provided with an opening near the periphery thereof through which the flexible tube passes whereby the disc supports and directs the flexible tube.

16 Claims, 7 Drawing Figures

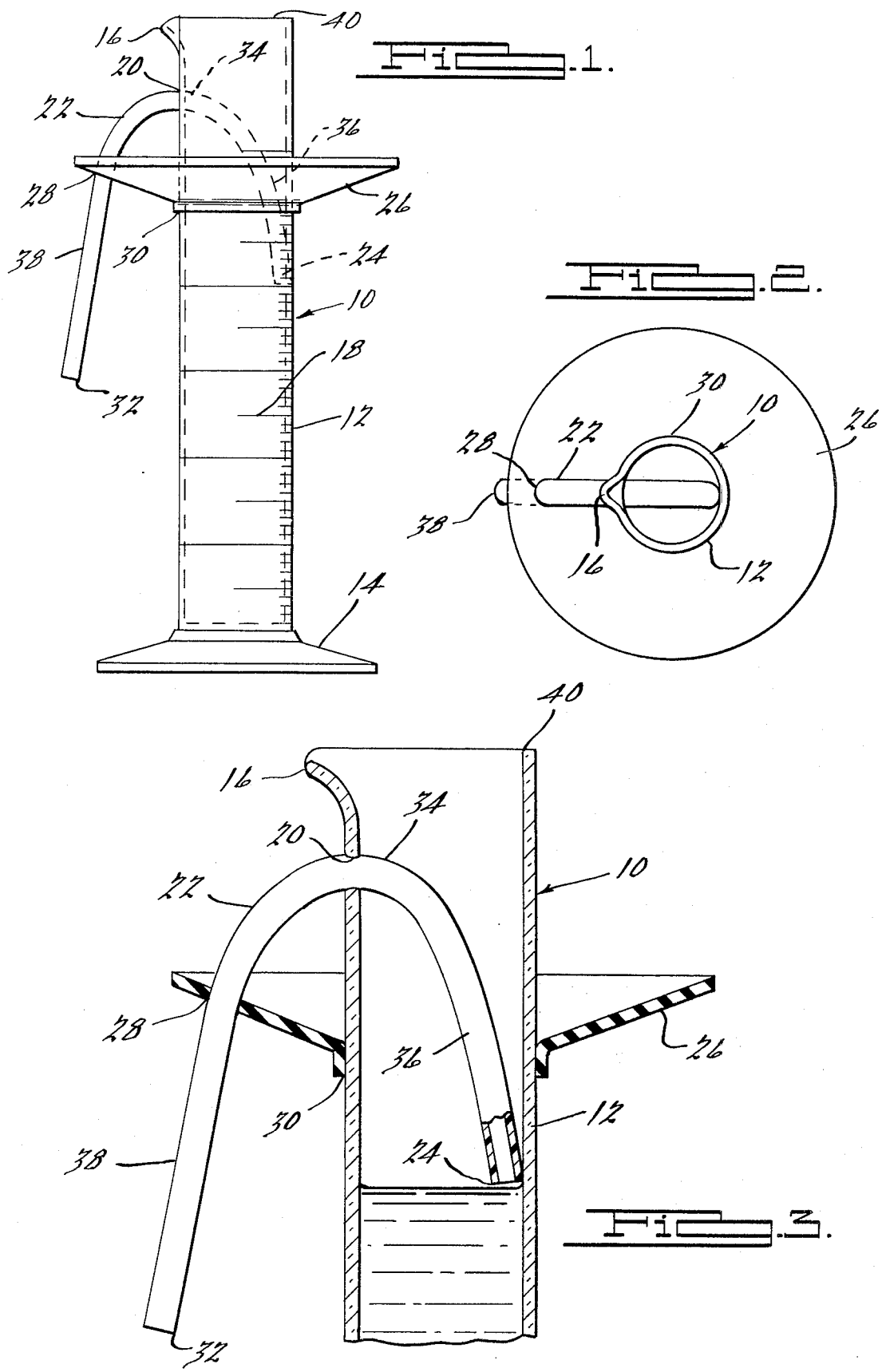

GRADUATE WITH AUTOMATIC MEASURING MEANS

BRIEF SUMMARY OF THE INVENTION

This invention relates to measuring means, and, more particularly, to an improved graduate with automatic measuring means particularly adapted for use where uniform quantities of a liquid are needed for repetitive procedures, as for example, in quality control.

As is well known in the art, graduates are used to measure precise amounts of liquid; and in order to do so, the user must align the meniscus of the liquid with the appropriate gradation on the graduate. This usually causes the user to have to either add or pour out increasingly smaller amounts of the liquid until the desired level is ultimately reached resulting in the loss of valuable time and effort. This loss is compounded whenever the procedure must be repeated over and over, as for example, in quality control operations.

An object of the present invention is to overcome the aforementioned as well as other disadvantages in prior measuring means of the indicated character and to provide an improved measuring means incorporating improved means for automatically filling a graduate to a predetermined level.

Another object of the invention is to provide an improved measuring means which increases the speed and accuracy of filling a graduate to a predetermined level and which enables the user to eliminate unnecessary and time consuming procedures.

Another object of the invention is to provide an improved graduate incorporating means which protects the hand of the user from spillage of harmful substances.

Another object of the invention is to provide an improved graduate incorporating a flexible disc which aids in protection of the graduate from breakage and which also functions to support the graduate for drying purposes.

Another object of the invention is to provide an improved graduate incorporating a flexible disc which directs and supports a tube passing from the tubular body portion of the graduate through the disc.

The above as well as other objects and advantages of the present invention will become apparent from the following description, the appended claims and the accompanying drawings.

BRIEF DESCRIPTION OF THE DRAWINGS

FIG. 1 is a side elevational view of a graduate embodying the present invention;

FIG. 2 is a top plan view of the structure illustrated in FIG. 1;

FIG. 3 is an enlarged cross-sectional view of the upper portion of the structure illustrated in FIG. 1;

DETAILED DESCRIPTION

Figure 4:
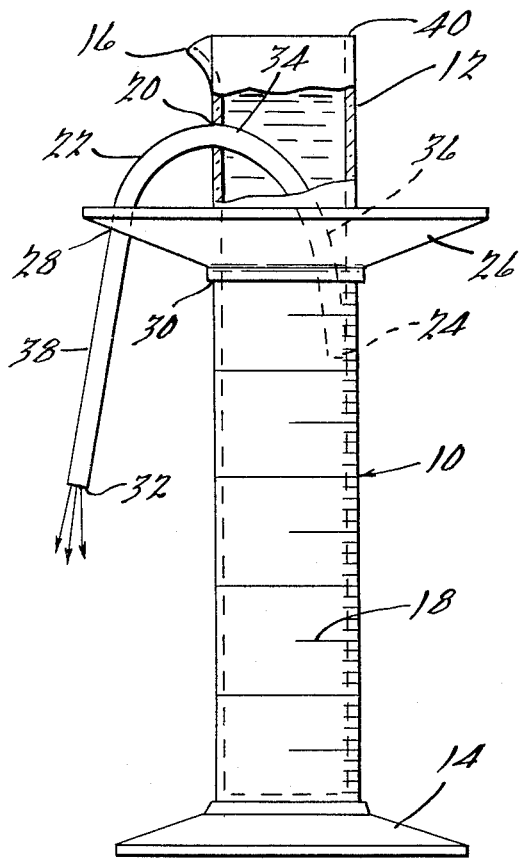
FIG. 4 is a side elevational view of the structure illustrated in FIG. 1, illustrating the manner in which excess liquid is automatically emptied therefrom.

Referring to the drawings, a preferred embodiment of the invention is illustrated in FIGS. 1 through 7 thereof and is comprised of a graduate, generally designated 10, which is particularly adapted for rapid, repeatedly accurate measurements of liquids, although it will be understood that the present invention is applicable to other uses. As shown in the drawings, the graduate 10 is comprised of a tubular body portion 12 closed at the lower end thereof by a base 14 while the upper end portion of the tubular body is open and provided with a pouring lip 16. The graduate may be made of glass, plastic, or any other suitable material. The periphery of the tubular body portion 12 is provided with gradations 18 for measuring the quantity of liquid in the graduate. In accordance with the present invention, the tubular body portion 12 is provided with a circular opening 20 which is preferably disposed directly below the pouring lip 16 but above the gradations 18. A flexible tube 22, which may be formed of plastic, rubber or other suitable material, is inserted through the circular opening 20 with the inner end 24 of the tube 22 being disposed at the level within the graduate to which it is desired to ultimately fill the graduate 10. For example, depending on the capacity of the graduate 10, the inner end 24 of the tube may be adjusted to the 100 milliliter level, the 80 milliliter level, or at any other desired level within the body portion of the graduate.

As illustrated in FIGS. 1 through 7, a generally cup-shaped disc 26 is provided which may be formed of rubber or any other resilient material having sufficient strength to withstand the forces exerted thereon. The disc 26 is provided with a circular opening 28 adjacent the periphery of the disc through which the tube 22 projects so that the disc 26 assists in supporting the tube 22. The disc 26 is provided with a centrally disposed opening 30 adapted to receive the tubular body portion 12 of the graduate 10 so that the disc 26 fits tightly around the graduate. In addition to acting as a support for the tube 22, the disc also serves as a resilient bumper which prevents breakage of the graduate in the event it is accidentally knocked over, guards against spillage of harmful liquids on the hand of the user holding the graduate between the disc 26 and the base 14, and facilitates drying of the measuring means by acting as a base when the graduate is inverted. This multiplicity of function will be described hereinafter in greater detail.

Figure 5:
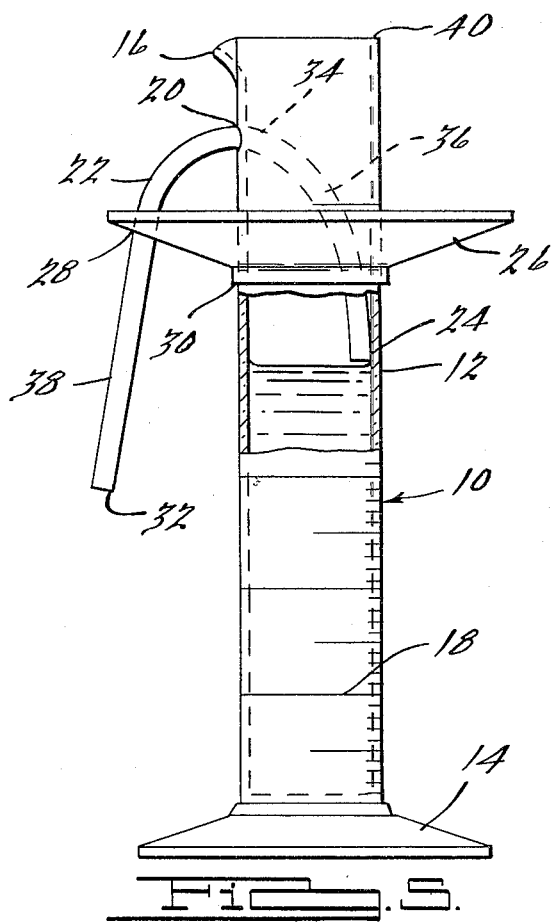
FIG. 5 is a side elevational view of the structure illustrated in FIG. 1, showing the same filled to the desired predetermined level.
Figure 6:
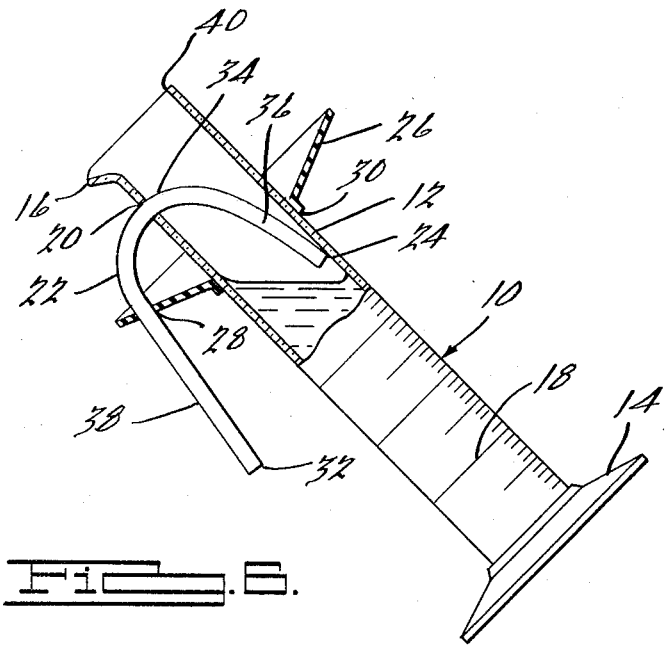
FIG. 6 is a side elevational view of the structure illustrated in FIG. 1, illustrating the manner in which the measured liquid therein flows away from the inner end of the tube when the measured liquid is emptied from the graduate.

FIGS. 4, 5 and 6 illustrate the manner in which the graduate 10 may be utilized to measure, rapidly and repeatedly, precise volumes of liquid. The graduate 10 is particularly adapted for use in measurement when abundant quantities of the liquid which is to be measured are available, as for example, at water or sewage treatment plants where liquids are constantly monitored. When the inner end 24 of the tube is disposed at the desired level within the graduate 10 and the outer end 32 of the tube is disposed at a lower elevation outside the graduate 10, a siphoning action is established when the graduate 10 is filled with liquid above the bight 34 in the tube. Ambient atmospheric pressure forces the liquid up the shorter inner leg 36 of the tube and out the longer leg 38 of the tube in a continuous flow which automatically empties the graduate 10 to the desired predetermined level determined by the adjusted position of the inner end 24 of the tube.

It will be apparent that the measuring means will not automatically empty to the desired level unless the liquid in the graduate is initially above the bight 34 in the tube. However, when the liquid level is below the bight 34 in the tube, the user can readily and conveniently initiate a siphoning action through the tube 22 by placing the palm of the hand over the open end 40 of the graduate and pushing downwardly thereby exerting additional air pressure on the surface of the liquid to force the liquid over the bight portion 34 of the tube. The liquid will then flow through the leg 38 of the tube and the graduate 10 will automatically empty to the desired predetermined level.

FIG. 6 illustrates that when the measured liquid is to be poured from the graduate 10 over the lip 16 the liquid therein naturally flows away from the inner end 24 of the tube thereby preventing any measured liquid from being lost through the tube 22. This assures that the volume of liquid poured from the measuring means will always be the amount actually measured.

As previously mentioned, the cupped disc 26 serves a multiplicity of functions. More particularly, the disc serves as a bumper or protective collar which aids in preventing breakage of the graduate in the event it is accidentally knocked over. The resilient nature of the material from which the disc 26 is formed acts to not only cushion the graduate from the force of the impact but also causes the point of impact to be removed from the tubular body portion of the graduate 10. The resulting effect is to minimize the danger of damaging the tubular body portion 12 of the graduate 10 and the pouring lip 16 thereof. Additionally, the cupped disc 26 prevents the spilling of harmful liquids on the hand of the user. As illustrated in FIGS. 1 through 6, the combined effect of the inverted conical shape of the disc 26 and the seal formed between the centrally disposed opening 30 of the disc 26 and the tubular body portion 12 of the graduate is to cause any spillage to accumulate in the disc 26 rather than running onto the hand of the user. Such accumulations can then be safely disposed of without endangering the user. Another function of the disc 26 is to support and direct the tube 22. By vertically moving the disc 26 along the tubular body portion 12 of the graduate the user can adjust the distance between the outer end of the tube 22 and the body portion of the graduate. The higher the disc is on the tubular body portion 12 the further the outer end of the tube will be from the graduate 10; the lower the disc is on the tubular body portion 12 the closer the outer end 32 of the tube will be to the graduate. Rotation of the disc proximally or distally from the circular hole 20 through which the tube 22 passes allows the user to longitudinally direct the flow of liquid from the outer end 32 of the tube. Hence, manipulation of the disc 26 allows the user to direct the flow of liquid from the outer end 32 of the tube in any desired direction. If the discharge from the outer end 32 of the tube is not needed, it can be wasted into a sink, and if the discharge is needed, it can be directed into a suitable receiving container.

Figure 7:
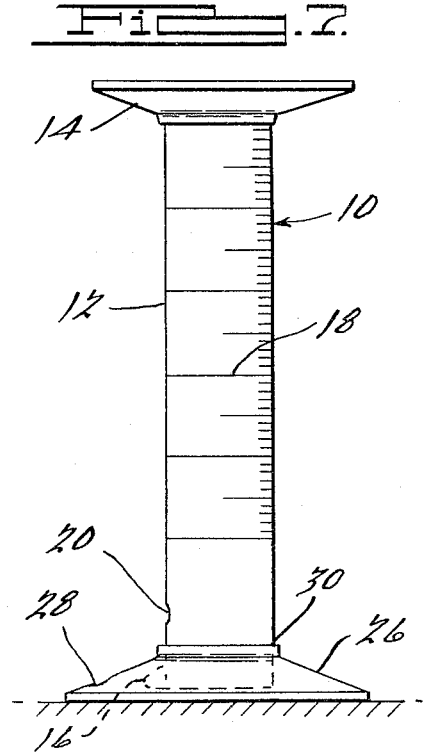
FIG. 7 is a side elevational view of the graduate illustrated in FIG. 1, showing the same in an inverted position and illustrating the manner by which the disc may be utilized to support the graduate to facilitate drying of the graduate after it has been cleaned.

Another function of the disc 26 is to facilitate drying of the automatic measuring means after washing thereof. In FIG. 7, the tube 22 is shown removed from the disc and the graduate and the graduate is shown in an inverted position. The disc 26 is shown positioned near the open end of the graduate between the circular opening 20 and the pouring lip 16. So located, the disc 26 forms a stable base which allows liquid to drain from the graduate. It will be noted that with the tube 22 removed from the circular opening 20 of the graduate and from the peripherally located opening 28 in the disc, air is permitted to circulate through the opening 20 in the tubular body portion 12 of the graduate and the opening 28 in the disc to facilitate drying of the graduate.

It will be understood that the graduate can be used in a normal fashion at any level below the level at which the inner end 24 of the tube 22 is set, or the tube 22 may be removed and the opening 20 closed with a suitable plug to permit use of the graduate in a conventional manner.

While a preferred embodiment of the invention has been illustrated and described, it will be understood that various changes and modifications may be made without departing from the spirit of the invention.

What is claimed is:

1. A vessel with automatic liquid measuring means comprising, in combination, a tubular body closed at the lower end thereof, the upper end of said tubular body being open, said tubular body defining an opening near, but spaced from, the upper end thereof, a flexible tube extending through said opening, the inner end of said tube being disposed within said tubular body at a predetermined level, the outer end of said tube being disposed at a level below said inner end of said tube.

2. The combination as set forth in claim 1 including a disc encompassing said tubular body, said disc defining a passageway through which said tube projects.

3. The combination as set forth in claim 2, said disc being provided with a centrally disposed opening adapted to receive said tubular body whereby said disc fits tightly around the periphery of said tubular body.

4. The combination as set forth in claim 2, said disc being of cup-shaped configuration.

5. The combination as set forth in claim 2, said disc being formed of flexible, resilient material whereby said disc serves as a bumper for said tubular body portion.

6. The combination as set forth in claim 2, said disc being movable with respect to said body portion.

7. A vessel with automatic liquid measuring means comprising, in combination, a tubular body closed at the lower end thereof, the upper end portion of said tubular body being open and being provided with a pouring lip, the periphery of said tubular body being provided with gradations for measuring the quantity of liquid in said tubular body, said tubular body defining an opening directly beneath said pouring lip, a flexible tube extending through said opening, the inner end of said tube being disposed within said tubular body at a predetermined level, the outer end of said tube being disposed at a level below said inner end of said tube.

8. The combination as set forth in claim 7 including a disc encompassing said tubular body, said disc defining a passageway through which said tube projects.

9. The combination as set forth in claim 8, said disc being provided with a centrally disposed opening adapted to receive said tubular body whereby said disc fits tightly around the periphery of said tubular body.

10. The combination as set forth in claim 9, said disc being of cup-shaped configuration.

11. The combination as set forth in claim 10, said disc being formed of flexible, resilient material whereby said disc serves as a bumper for said tubular body portion.

12. The combination as set forth in claim 11, said disc being movable with respect to said body portion.

13. A graduate with automatic liquid measuring means comprising, in combination, a tubular body closed at the lower end thereof, the upper end portion of said tubular body being open and being provided with a pouring lip, the periphery of said tubular body being provided with gradations for measuring the quantity of liquid in said tubular body, said tubular body defining an opening near, but spaced from, and directly beneath said pouring lip, a flexible tube extending through said opening, the inner end of said tube being disposed within said tubular body at a predetermined level, the outer end of said tube being disposed at a level below the inner end of said tube, and a disc encompassing said tubular body, said disc defining a passageway through which said tube projects.

14. The combination as set forth in claim 13, said disc being of generally cup-shaped configuration and being provided with a centrally disposed opening adapted to receive said tubular body whereby said disc fits tightly around the periphery of said tubular body.

15. The combination as set forth in claim 14, said disc being formed of flexible, resilient material whereby said disc serves as a bumper for said tubular body portion.

16. The combination as set forth in claim 15, said disc being movable with respect to said body portion.

* * * * *